(No Model.) 5 Sheets—Sheet 1.
C. A. LITTLEFIELD.
LOOM FOR CROSS WEAVING.
No. 380,761. Patented Apr. 10, 1888.
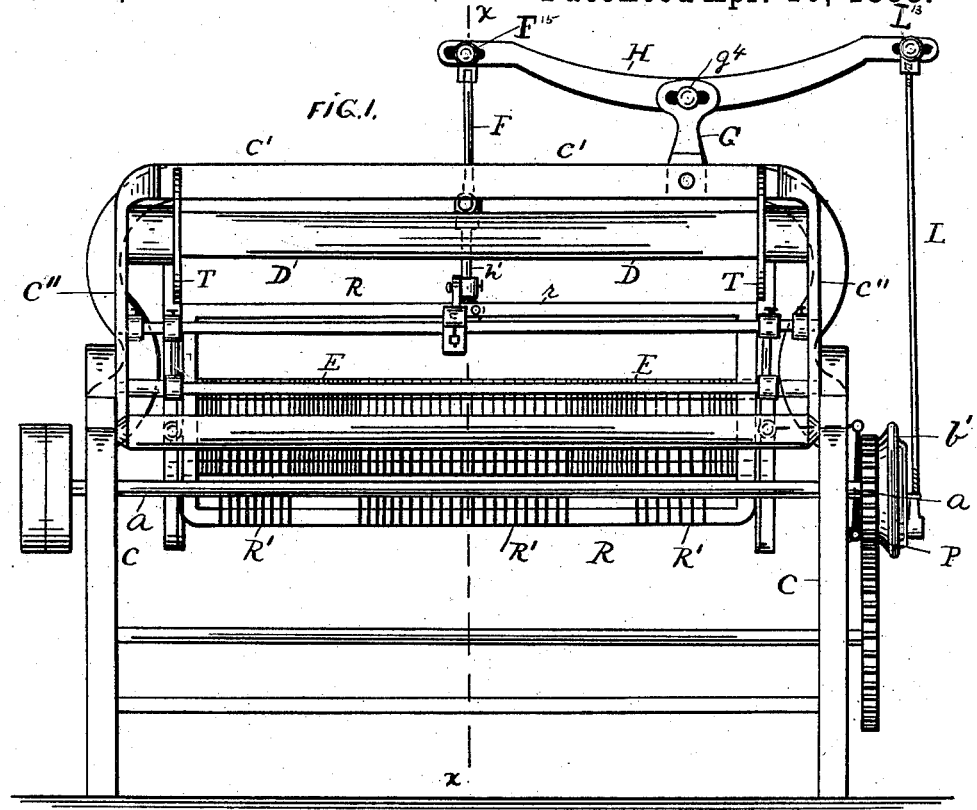
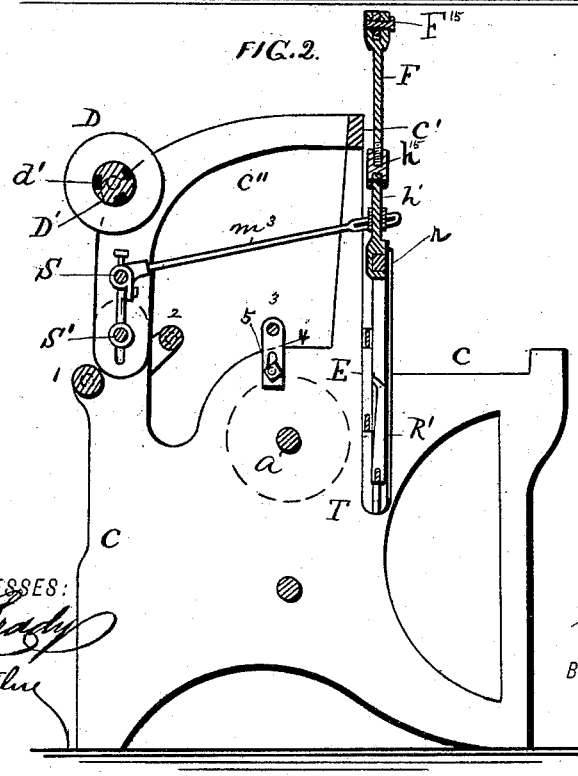
WITNESSES:
Thos. S. Grady
James T. Milne
INVENTOR
Charles A. Littlefield
BY Lewis F. Brown
ATTORNEY (No Model.) 5 Sheets—Sheet 2.
C. A. LITTLEFIELD.
LOOM FOR CROSS WEAVING.
No. 380,761. Patented Apr. 10, 1888.
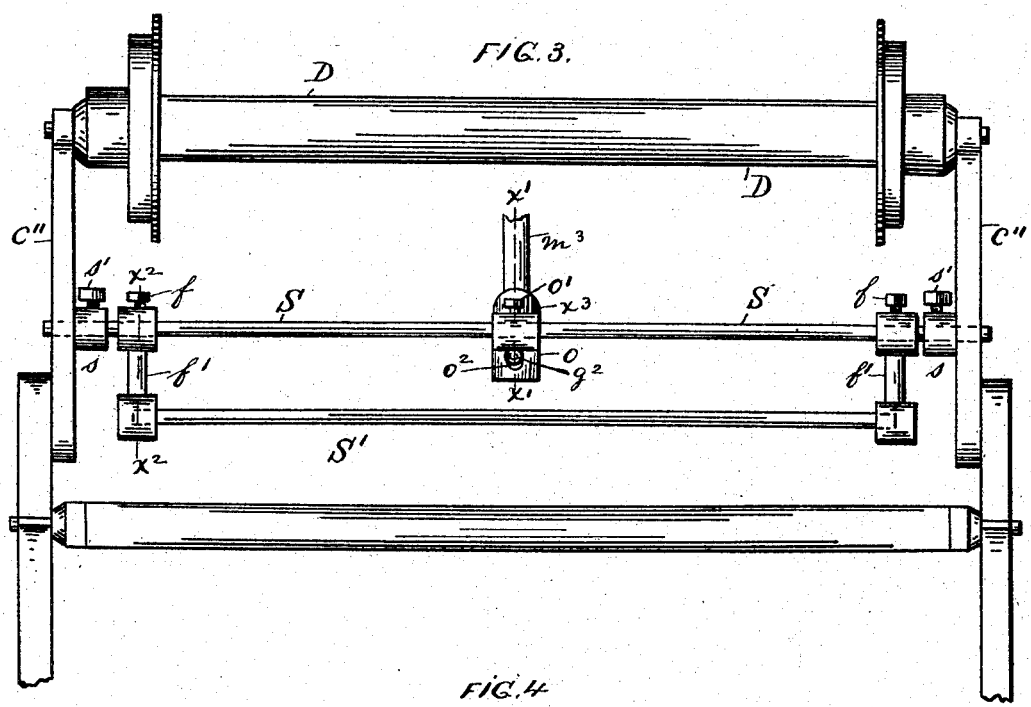
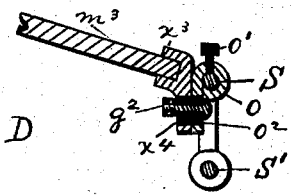
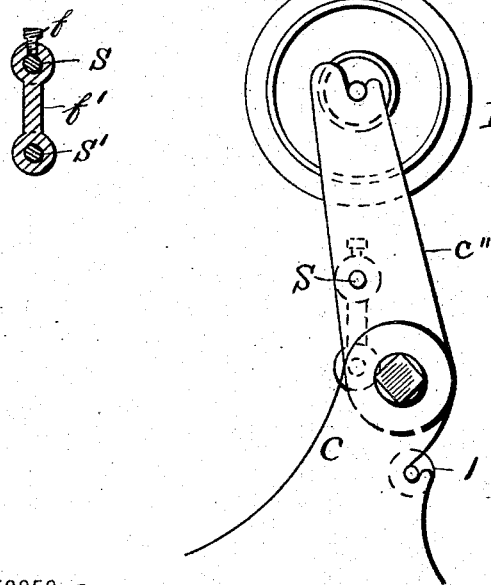
WITNESSES:
Thos. F. Brady
James F. Milne
INVENTOR.
Charles A. Littlefield.
BY Lewis F. Browe,
ATTORNEY.

(No Model.) 5 Sheets—Sheet 3.
C. A. LITTLEFIELD.
LOOM FOR CROSS WEAVING.
No. 380,761. Patented Apr. 10, 1888.
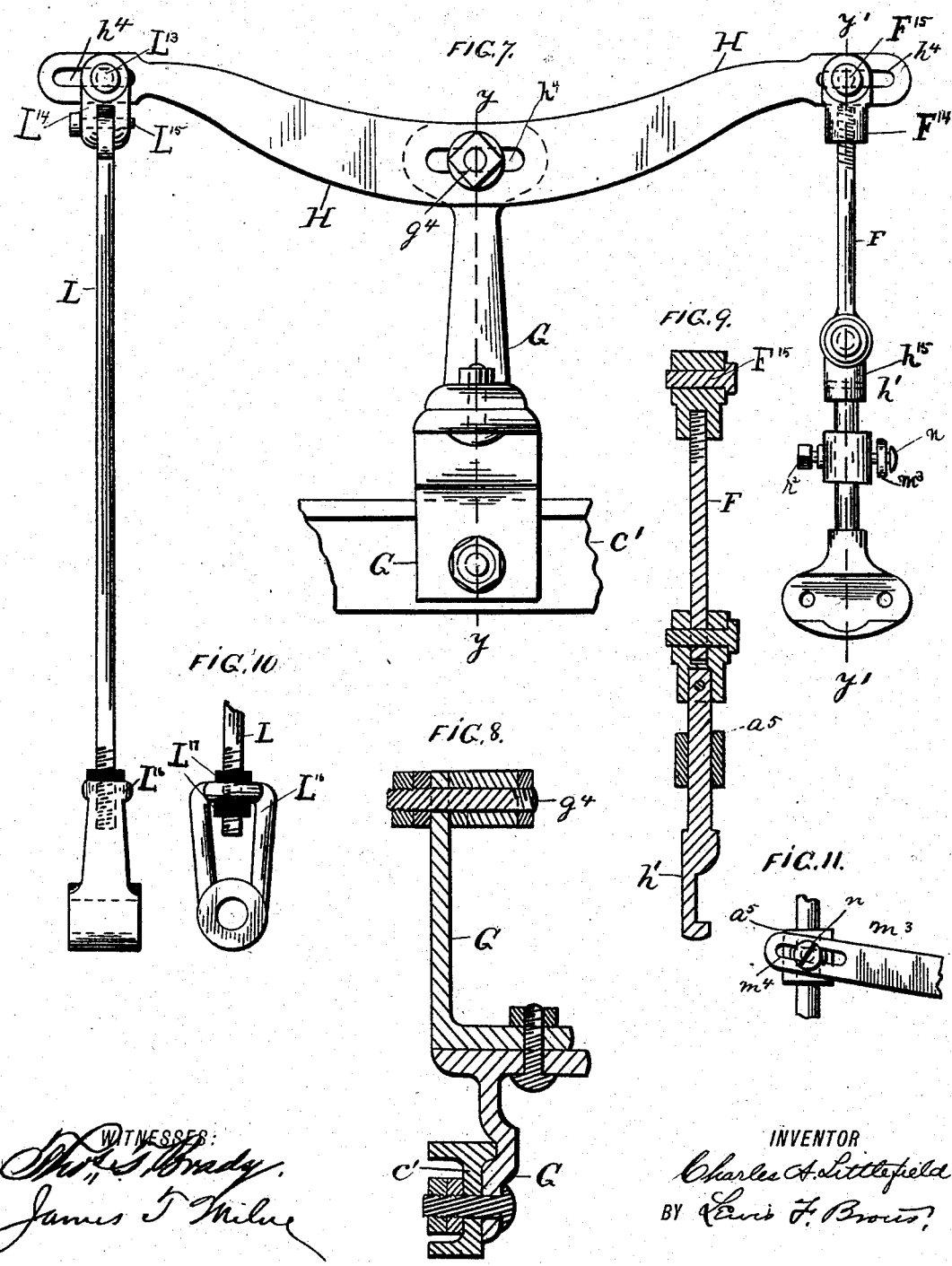

(No Model.)  5 Sheets—Sheet 4.
C. A. LITTLEFIELD.
LOOM FOR CROSS WEAVING.
No. 380,761.  Patented Apr. 10, 1888.
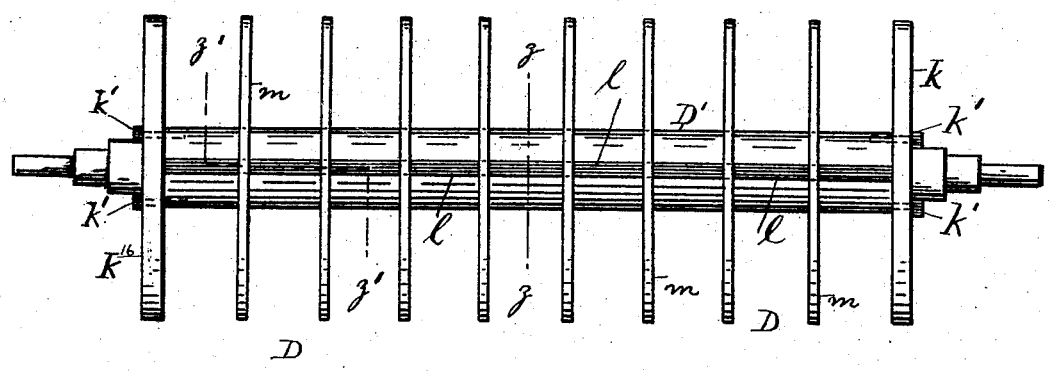
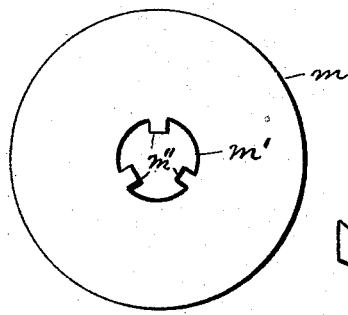
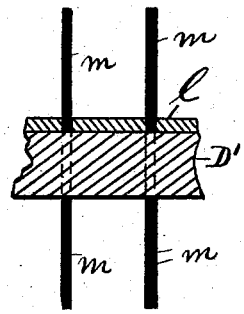
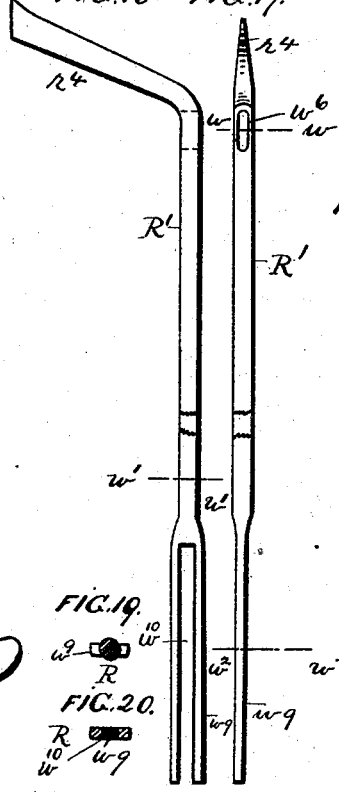
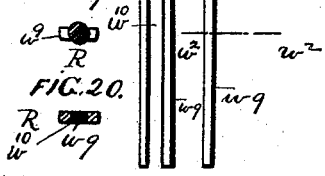
INVENTOR.
Charles A. Littlefield
BY Lewis F. Brown
ATTORNEY.

(No Model.) 5 Sheets—Sheet 5.
C. A. LITTLEFIELD.
LOOM FOR CROSS WEAVING.
No. 380,761. Patented Apr. 10, 1888.
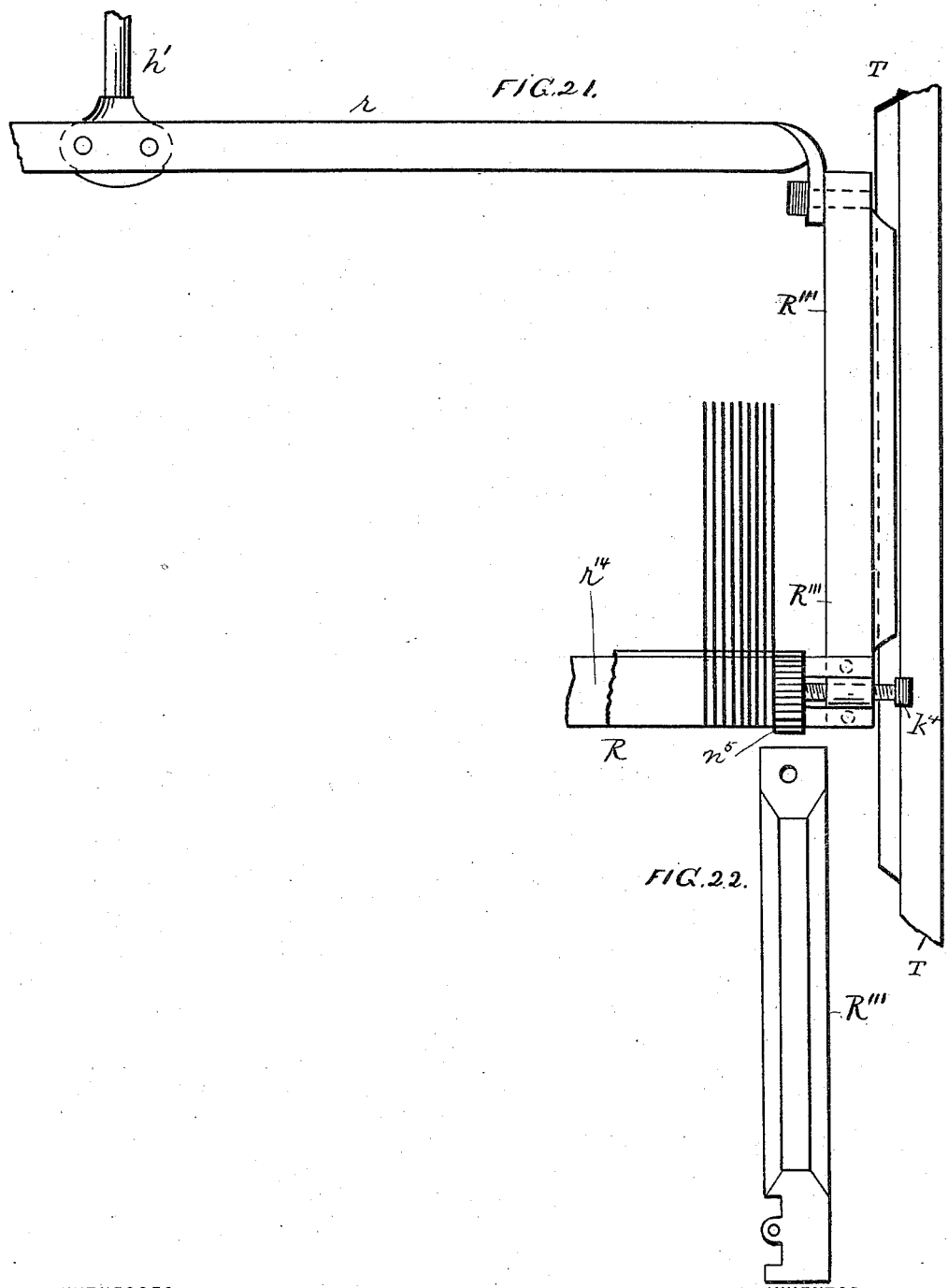
WITNESSES:
INVENTOR.
ATTORNEY.

UNITED STATES PATENT OFFICE.

CHARLES A. LITTLEFIELD, OF FALL RIVER, MASSACHUSETTS, ASSIGNOR TO ELIAS A. TUTTLE AND JAMES T. MILNE, BOTH OF SAME PLACE.

LOOM FOR CROSS-WEAVING.

SPECIFICATION forming part of Letters Patent No. 380,761, dated April 10, 1888.

Application filed February 21, 1887. Serial No. 228,362. (No model.)

*To all whom it may concern:*

Be it known that I, CHARLES A. LITTLEFIELD, a citizen of the United States, residing at Fall River, in the county of Bristol and State of Massachusetts, have invented certain new and useful Improvements in Looms for Cross-Weaving; and I do hereby declare the following to be a full, clear, and exact description of the invention, such as will enable others skilled in the art to which it appertains to make and use the same.

It frequently occurs in weaving that it is necessary to use a warp composed of a comparatively small number of ends. Inconvenience results in the preparation of such warps, from various reasons, among which is the danger of breakage in passing through the slasher. For example, in some cases the smallest number of ends that can be passed through the slasher is six hundred, yet it often happens that a warp of only four hundred ends is required for the production of a particular fabric. On account of breakage such a small warp cannot be passed through the slashers in ordinary use.

One object of my invention is to enable a warp of any desired number of ends to be provided in a more simple and expeditious manner; and, therefore, my invention consists, first, in a sectional warp-beam of improved construction having intermediate heads or disks spaced for the reception in the intervening spaces of any desired number of ends. In practice, a warp of any given number of ends being required, such number being less than can conveniently or safely be passed through the preparatory treatment, I first form a large warp of twice the required number of ends, or any other suitable multiple thereof, and after finishing the same wind the whole at once upon my sectional beam. In so winding, however, the large warp is divided by the intermediate heads of the beam into fractional parts, one or more of which will give the required number of ends. In weaving from this beam I take the ends required for the production of the pattern or some stripe thereof from one or more of the subdivisions of the beam and draw the same in the reed and harness in the usual manner. Having used up the warp from such subdivision or subdivisions, I twist on the ends from one or more adjoining subdivisions and continue the weaving. My beam is particularly useful in weaving leno and other fabrics having cross-woven stripes, and is also of value for use in the production of seersuckers. I am aware that a sectional beam is not, broadly, new, and such I do not broadly claim.

A second object of my invention is to provide improved means for easing or relieving the strain on the threads while the same are being crossed.

To this end my invention consists, secondly, in an improved easing device constructed as hereinafter described and claimed, whereby the threads passing through the eyes of the needles, hereinafter described, are slackened during each rise of the said needles past the standing threads.

My invention consists, further, in a needle of improved construction for operating the crossing threads.

In the accompanying drawings, Figure 1 is a view in elevation from the rear of sufficient of a loom-frame to illustrate the application of my invention with my invention applied thereto. Fig. 2 is a view of the same in section on the line $x\ x$ of Fig. 1. Fig. 3 is a view of a portion of the loom frame and a portion of the easing devices. Fig. 4 is an end view of the parts shown in Fig. 3. Figs. 5 and 6 are sectional views of details of the easing devices. Figs. 7, 8, 9, 10, and 11 are views of parts connected with the needle-holding frame and portions of the easing devices. Fig. 12 is a side elevation of the sectional beam. Fig. 13 is a view of one of the intermediate disks thereof. Figs. 14 and 15 are sectional views of the beam. Figs. 16, 17, 18, 19, and 20 are views of one of the needles, Fig. 16 being a side view thereof, Fig. 17 an edge view, Fig. 18 a view in section on the line $w\ w$ of Fig. 17, Fig. 19 a view in section on the line $w'\ w'$ of Fig. 16, and Fig. 20 a view in section on the line $w^2\ w^2$ of Fig. 17. Fig. 21 is a view of a portion of the needle-holding frame and one of its guides, and Fig. 22 is a side elevation of one of the end pieces of the needle-holding frame.

C is the loom-frame, C' the arch thereof, and

D the beam for the warps passing through the eyes of the needles R', hereinafter referred to.

In Figs. 1 and 3 I have, in order to avoid complexity in the drawings, shown an ordinary plain beam; but in Fig. 12 the beam is shown as sectional, and constructed in accordance with my invention.

1 is a guide-roll for the body or main warps, over which roll the said warps pass to the forward portion of the loom, and 2 3 are guide-rolls under which the warps from beam D pass on their way to the needles R', roll 3 being mounted in slotted supports 4, adjustably secured by bolts 5 to the loom-sides.

Beam D is shown supported in curved pieces C'', secured to the loom-sides and to the arch C'. In constructing the said beam in accordance with my invention I groove the body or barrel D' thereof in three or any other desired number of places, as shown at $d'$ in Fig. 14. At each end of the beam is a head or flange, $k$ $k^{16}$, one of which, as $k$, may be fast, while the other, $k^{16}$, may be removable, while at intermediate points are placed disks or heads $m$, equal in diameter to the heads $k$ $k^{16}$. The heads $k$ $k^{16}$ are of usual form and construction; but each intermediate head, $m$, at its central aperture, $m'$, is formed with inwardly-extending projections $m''$, adapted to fit the grooves $d'$ of the body D'. The said intermediate heads, $m$, are slipped upon the body D', the projections $m''$ thereof fitting the grooves $d'$, and spacing-blocks $l$, fitting the said grooves, being interposed to separate the heads from one another, as desired. The heads $k$ $k^{16}$ are secured to the body in any suitable known manner. I have shown them secured by bolts $k'$, passing through the heads and into the ends of the body or barrel D'. On their way from beam D to the guide-roll 2 the warps pass around the rod or roll S', which is fitted at its ends, as shown in Fig. 3, to sockets at the lower ends of arms $f'$ $f'$, said arms having tubular upper ends, which are slipped upon the supporting-rod S and adjustably secured in place thereon by set-screws $f$. Said rod S is fitted to bearings in the pieces $c''$ $c''$, it having upon it collars $s$ $s$, adjustably secured thereon by set-screws $s'$ $s'$, and serving to hold it against endwise movement through the said pieces. Upon rod S is also secured by set-screw $o'$ a block, $o$, having a tubular portion to fit upon the rod. A second block, $X^3$, having a screw-threaded socket in its upper part, is fastened to the block $o$ by means of bolt $g^2$ passing through slots $o^2$ and $X^4$ in the said blocks $o$ and $X^3$, respectively, the said slots permitting of adjustment of the parts to vary the amount of movement imparted to the rods S S', &c., and consequently of regulation of the extent to which the warps of the needles are slackened. Into the socket of block $X^3$ is screwed the rear end of arm $m^3$, said arm being slotted at its forward end, as shown in Fig. 2, to receive the bolt or screw $n$, the latter being screwed into the collar $a^5$, which is held by a screw, $r^2$, in adjusted position upon the stand $h'$, made fast to the top bar, $r$, of the needle-holding frame R.

$h^4$ are slots in lever H to permit adjustment of pins $L^{13}$, $g^4$, and $F^{15}$.

Through the devices described each upward movement of the said frame R to effect a crossing of the warps occasions a forward movement of rod S' and slackens the warps passing through the eyes of the needles R'.

The top bar, $r$, and bottom bar, $r^{14}$, of the frame R are bolted to end pieces, R''', one of which is shown separately in Fig. 22, said end pieces fitting guides T, applied to the arch of the loom-frame, and preferably constructed as shown, described, and claimed in my application filed February 21, 1887, Serial No. 228,363.

To the top of stand $h'$ is fastened a cap or socket-piece, $h''$, to which is pivoted the lower end of a rod, F, which at its upper end is threaded and screwed into a socket-piece, $F^{14}$, through which passes the pin or bolt $F^{15}$, serving to pivot said socket-piece to the extremity of the inner arm of the lever H. Lever H is pivoted on a pin, $g^4$, upon a stand, G, fastened, as shown in Figs. 7 and 8, to the arch C', and at the extremity of its outer arm has pivoted thereto by a pin or bolt, $L^{13}$, a link, $L^{14}$, in turn pivoted by a pin, $L^{15}$, to the upper end of a rod, L, which at its lower end is threaded and screwed into a block, $L^{16}$, fitted to a crank-pin upon the wheel $b'$ at one end of the crank-shaft $a$ of the loom. By means of lock-nuts $L^{17}$ $L^{17}$ the rod L is held in the position to which it is adjusted in the block $L^{16}$.

The needle R' is constructed of round wire bent to form an inclined head, $r^4$, which is flattened on its opposite sides and tapers upwardly in wedge shape, as shown in Fig. 17. An elongated eye, $W^6$, is formed through the body of the needle just below the head and in line with said head, and the lower end of the body is flattened and slotted at $W^{10}$ to form the branches $W^9$ of its foot. The needles thus constructed are applied to bar $r^{14}$, the branches thereof straddling said bar, as shown, and separating and spacing pieces and blocks are interposed between them, as in my application aforesaid, Serial No. 228,363, the needles and intermediate pieces and blocks being clamped firmly together by the screws $k^4$ passing through the end pieces, R'''.

E is the laterally-moving reed, whereby I shift the standing threads from side to side of the needles. This reed may be actuated by the means shown, described, and claimed in my application filed September 20, 1886, Serial No. 214,070.

Having described my invention, I claim—

1. The combination, with the warp-beam body or barrel grooved at $d'$ and the heads $k$ $k^{16}$, of the intermediate heads, $m$, having projections $m'$, and the blocks $l$, substantially as described.

2. The combination, with the needle-holding frame having stand $h'$ and means for actuating said frame, of screw $n$, slotted arm $m^3$, rod S, means for connecting said arm to said rod, rod S', and arms $f'\,f'$, substantially as described.

3. The combination, with the needle-holding frame, stand $h'$, and means for actuating said frame, of screw $n$, slotted arm $m^3$, rod S, blocks $x^3$ and $o$, bolt $g^2$, rod S', and arms $f'\,f'$, substantially as described.

4. The combination, with the needle-holding frame, stand $h'$, and means for actuating said frame, of screw $n$, slotted arm $m^3$, rod S, blocks $x^3$ and $o$, slotted as described, bolt $g^2$, passing through the slots in said blocks, arms $f'\,f'$, and rod S', substantially as described.

5. The needle R', having a flat tapering inclined angular head, an elongated eye in line with said inclined head made through the body of the needle, and an open slotted and flat foot portion, as described.

In testimony whereof I affix my signature in presence of two witnesses.

CHARLES A. LITTLEFIELD.

Witnesses:
   THOS. T. BRADY,
   LEWIS F. BROUS.